United States Patent
Yoshida et al.

(10) Patent No.: US 7,643,116 B2
(45) Date of Patent: Jan. 5, 2010

(54) LIQUID CRYSTAL DISPLAY DEVICE

(75) Inventors: Hidefumi Yoshida, Kawasaki (JP);
Masakazu Shibasaki, Kawasaki (JP);
Tsuyoshi Kamada, Kawasaki (JP);
Kunihiro Tashiro, Kawasaki (JP);
Yasutoshi Tasaka, Kawasaki (JP);
Kazuya Ueda, Kawasaki (JP)

(73) Assignees: Fujitsu Limited, Kawasaki (JP); Au Optronics Corporation, Hsinchu (TW)

( * ) Notice: Subject to any disclaimer, the term of this patent is extended or adjusted under 35 U.S.C. 154(b) by 546 days.

(21) Appl. No.: 11/045,576

(22) Filed: Jan. 27, 2005

(65) Prior Publication Data
US 2006/0012738 A1    Jan. 19, 2006

(30) Foreign Application Priority Data
Jul. 16, 2004    (JP) .............................. 2004-210690

(51) Int. Cl.
*G02F 1/1335*    (2006.01)
(52) U.S. Cl. ....................................... 349/117; 349/119
(58) Field of Classification Search ................. 349/117, 349/119
See application file for complete search history.

(56) References Cited
U.S. PATENT DOCUMENTS

| 6,885,421 | B2 | 4/2005 | Miyachi |
|---|---|---|---|
| 6,922,222 | B2 | 7/2005 | Miyachi et al. |
| 7,095,467 | B2 | 8/2006 | Miyachi |
| 7,119,866 | B2 | 10/2006 | Miyachi |
| 7,176,999 | B2 | 2/2007 | Miyachi |
| 2004/0239852 | A1 | 12/2004 | Ono et al. |
| 2005/0062917 | A1* | 3/2005 | Kashima ...................... 349/120 |
| 2005/0270458 | A1* | 12/2005 | Ishikawa et al. ............. 349/118 |
| 2006/0244884 | A1* | 11/2006 | Jeon et al. .................... 349/119 |

FOREIGN PATENT DOCUMENTS

| JP | 7-28053 | 1/1995 |
|---|---|---|
| JP | 7-198943 | 8/1995 |
| JP | 2002-55342 | 4/2001 |
| JP | 2003-279992 | 10/2003 |
| JP | 2004-326089 | 11/2004 |
| JP | 2006-514754 | 5/2006 |
| WO | WO 03/032060 A1 | 4/2003 |

* cited by examiner

*Primary Examiner*—David Nelms
*Assistant Examiner*—Nathanael R Briggs
(74) *Attorney, Agent, or Firm*—Greer, Burns & Crain, Ltd.

(57) ABSTRACT

In a retardation film (c plate) for canceling the optical effect of a liquid crystal layer, the optical effect of the liquid crystal layer which is represented by $\Delta nd/\lambda$ increases as the wavelength $\lambda$ of incident light decreases. Accordingly, in order to cancel this effect, a negative retardation needs to be reduced as the wavelength of incident light increases. In a retardation film (a plate) for rotating the direction of polarization of light, an in-plane retardation needs to be increased as the wavelength $\lambda$ of incident light increases. It is preferable that both of these retardation films be placed. However, compared to known technologies, light leakage can be suppressed even using only any one of the retardation films.

5 Claims, 16 Drawing Sheets nx = ny >> nz nx >> ny = nz a practical example 1 a comparative example 1 a comparative example 2 ived from Figs. 2A and 2B. In the case of the
LIQUID CRYSTAL DISPLAY DEVICE

CROSS-REFERENCE TO RELATED APPLICATIONS

This application is based on and claims priority of Japanese Patent Application No. 2004-210690 filed on Jul. 16, 2004, the entire contents of which are incorporated herein by reference.

BACKGROUND OF THE INVENTION

1. Field of the Invention

The present invention relates to a vertical alignment liquid crystal display device in which liquid crystal molecules are aligned in a direction approximately perpendicular to a panel plane when a voltage is not applied. In particular, the present invention relates to a liquid crystal display device in which a retardation film is placed between a liquid crystal panel and a polarizing plate.

2. Description of the Prior Art

Liquid crystal display devices have the advantages that they are thin and light compared to cathode-ray tube (CRT) displays and that they can be driven at low voltages and have low power consumption. Accordingly, liquid crystal display devices are used in various kinds of electronic devices including televisions, notebook personal computers (PCs), desktop PCs, personal digital assistants (PDAs), mobile phones, and the like. In particular, active matrix liquid crystal display devices, in which a thin film transistor (TFT) is provided as a switching element for each picture element (sub-pixel), show excellent display characteristics comparable to those of CRT displays because of the high driving capabilities thereof, and therefore have come to be widely used even in fields in which CRT displays have been heretofore used, such as desktop PCs and televisions.

In general, a liquid crystal display device includes two transparent substrates and liquid crystals contained between these substrates. On one substrate, a picture element electrode, a TFT, and the like are formed for each picture element. On the other substrate, color filters facing the picture element electrodes, and a common electrode common to the picture elements, are formed. Hereinafter, the substrate on which the picture element electrodes and the TFTs are formed is referred to as a TFT substrate, and the substrate placed to face the TFT substrate is referred to as a counter substrate. Further, the structure made by filling the liquid crystals into the space between the TFT substrate and the counter substrate is referred to as a liquid crystal panel.

Heretofore, twisted nematic (TN) liquid crystal display devices have been popular in which horizontal alignment-type liquid crystals (liquid crystals with positive dielectric anisotropy) are contained between a TFT substrate and a counter substrate and in which liquid crystal molecules are aligned in a twisted manner. However, the TN liquid crystal display devices have the disadvantage that viewing angle characteristics are poor and that contrast and color greatly change when the screen is viewed from an oblique direction. Accordingly, in recent years, vertical alignment (VA) liquid crystal display devices, which are excellent in viewing angle characteristics compared to TN liquid crystal display devices, have come to be widely used. In VA liquid crystal display devices, vertical alignment-type liquid crystals (liquid crystals with negative dielectric anisotropy) are contained between a TFT substrate and a counter substrate.

FIG. 1 is a schematic diagram showing the constitution of a known VA liquid crystal display device. A liquid crystal panel 10 is constituted by filling vertical alignment-type liquid crystals into the space between a TFT substrate and a counter substrate as described above. On one side (lower side in the drawing) of the liquid crystal panel 10, a polarizing plate 11 is placed. On the other side (upper side in the drawing), a polarizing plate 12 is placed. The polarizing plate 11 has a structure in which a polarizing layer 11a is sandwiched between protective layers 11b and 11c. Similarly, the polarizing plate 12 has a structure in which a polarizing plate 12a is sandwiched between protective layers 12b and 12c. These polarizing plates 11 and 12 are placed with the absorption axes thereof oriented at right angles to each other.

A retardation film 13 having a negative retardation is placed between the liquid crystal panel 10 and the polarizing plate 11, and a retardation film 14 having a positive retardation is placed between the liquid crystal panel 10 and the polarizing plate 12.

As shown in FIG. 2A, the retardation film 13 has a negative retardation in the direction perpendicular to the film plane. When the refractive indices in the X, Y, and Z directions are respectively denoted by nx, ny, and nz, $nx=ny>>nz$ is satisfied. This film 13 having a negative retardation is referred to as a c plate.

Meanwhile, as shown in FIG. 2B, the retardation film 14 has a positive retardation in an in-plane direction of the film plane. When the refractive indices in the X, Y, and Z directions are respectively denoted by nx, ny, and nz, $nx>>ny=nz$ is satisfied. This film 14 having a positive retardation is referred to as an a plate. Heretofore, norbornene resin films, for example, films obtained by stretching ARTON films, manufactured by JSR Corporation, have been used as these retardation films 13 and 14. The retardations of these norbornene resin films have little wavelength dependence, and characteristics thereof are flat.

Viewing angle characteristics when these retardation films 13 and 14 are used are shown in FIG. 3. Note that FIG. 3 shows the results of calculating light transmittance in black display when the screen is viewed at the orientation of 45° (φ=45°) with respect to the horizontal direction (X direction) of the liquid crystal panel 10 and from the direction of 60° (θ=60°) with respect to the normal to the liquid crystal panel 10 as shown in FIG. 4. From this FIG. 3, it can be seen that, in the case where the retardation films 13 and 14 are used, leakage light in oblique directions is significantly reduced compared to the case where there are no retardation films.

In Japanese Unexamined Patent Publication No. 2003-279992, a technology is described in which, in a homogeneous alignment liquid crystal display device, a TN liquid crystal display device, or an STN liquid crystal display device using horizontal alignment-type liquid crystals, a retardation layer containing norbornene or polysulfane as a main constituent is placed between a liquid crystal panel and an optical film for viewing angle compensation on one side of the liquid crystal panel to suppress coloring due to the wavelength dependence of retardation.

Moreover, in Japanese Unexamined Patent Publication No. Hei 7(1995)-198943, a liquid crystal display device is described in which a retardation film and an elliptically polarizing plate are placed outside a liquid crystal panel (liquid crystal cell) to improve viewing angle characteristics.

SUMMARY OF THE INVENTION

Incidentally, the inventors of the present application consider that the above-described known liquid crystal display devices have the following problems. Specifically, as can be seen from FIG. 3, use of retardation films significantly reduce light leakage in oblique directions in black display, but there occurs slight light leakage of blue light (with a wavelength of approximately 400 to 450 nm) and red light (with a wavelength of approximately 700 to 750 nm). Accordingly, for example, when an image is displayed on a liquid crystal display device in a dark room, a black display portion sometimes looks purple when viewed from an oblique direction.

Moreover, in a liquid crystal display device which uses a light source, such as a backlight and a frontlight, display quality sometimes deteriorates due to heat generated by the light source.

In light of the above, an object of the present invention is to provide a liquid crystal display device in which light leakage in oblique directions can be further reduced compared to known technologies and which has excellent display quality.

Moreover, another object of the present invention is to provide a liquid crystal display device in which deterioration in display quality due to heat from a light source, such as a backlight and a frontlight, can be avoided.

A liquid crystal display device of a first aspect of the present invention includes: a liquid crystal panel made by filling vertical alignment-type liquid crystals into a space between a pair of substrates; a first polarizing plate placed on one side of the liquid crystal panel; and a second polarizing plate placed on other side of the liquid crystal panel. Here, the liquid crystal display device has, between the first and second polarizing plates, at least one of a first retardation layer in which an in-plane retardation in the wavelength range of 380 to 780 nm increases as a wavelength of light increases, and a second retardation layer in which a negative retardation in the wavelength range of 380 to 780 nm decreases as the wavelength of light increases.

Heretofore, retardation films have been used for canceling the optical effect of a liquid crystal layer of the liquid crystal display device or rotating the direction of polarization of light. As for retardation films, ones having no wavelength dependence of optical effect have been used. However, experiments and researches by the inventors of the present application have revealed that, in retardation films having no wavelength dependence of optical effect, leakage of blue light or red light in oblique directions occurs in black display.

In a retardation film for canceling the optical effect of a liquid crystal layer, in order to cancel this effect, a negative retardation needs to be reduced as the wavelength of incident light increases, because the optical effect of the liquid crystal layer represented by $\Delta nd/\lambda$ increases as the wavelength $\lambda$ of incident light decreases. In a retardation film for rotating the direction of polarization of light, an in-plane retardation needs to be increased as the wavelength $\lambda$ of incident light increases. It is preferable that both of these retardation films be placed. However, compared to known technologies, light leakage can be suppressed even using only any one of the retardation films.

A liquid crystal display device of a second aspect of the present invention includes: a liquid crystal panel made by filling vertical alignment-type liquid crystals into a space between a pair of substrates; a light source placed on one side of the liquid crystal panel; a first polarizing plate placed between the liquid crystal panel and the light source; a second polarizing plate placed on other side of the liquid crystal panel; a first circular polarizer placed between the liquid crystal panel and the first polarizing plate; and a second circular polarizer placed between the liquid crystal panel and the second polarizing plate. Here, a plurality of refractive index anisotropy compensation films for compensating refractive index anisotropy of a liquid crystal layer of the liquid crystal panel are placed only between the liquid crystal panel and the second polarizing plate.

In MVA liquid crystal display devices, transmittance is low in the vicinities of domain regulation structures. Accordingly, MVA liquid crystal display devices have the disadvantage that brightness in white display is low compared to TN liquid crystal display devices. In order to avoid this, a circular polarizer may be placed between a liquid crystal panel and a polarizing plate. However, in this case, a viewing angle is narrow compared to the case where no circular polarizer is placed.

In the present invention, a viewing angle is widened by using refractive index anisotropy compensation films for compensating the negative refractive index anisotropy of a liquid crystal layer. As the refractive index anisotropy compensation films, polymer films, such as cellulose triacetate (TAC) films, which have positive refractive index anisotropy, are used. However, characteristics of films of this type change due to heat generated by a backlight or the like, and this causes unevenness of display.

In light of this, in the present invention, the refractive index anisotropy compensation films are placed on the opposite side of the liquid crystal panel from the light source, such as a backlight. This makes it possible to suppress a change in characteristics of the refractive index anisotropy compensation films due to heat generated by a backlight or the like, and to obtain favorable display quality.

DESCRIPTION OF THE PREFERRED EMBODIMENTS

Embodiments of the present invention will be described below based on the drawings.

First Embodiment

Hereinafter, a first embodiment of the present invention will be described.

Figure 1:
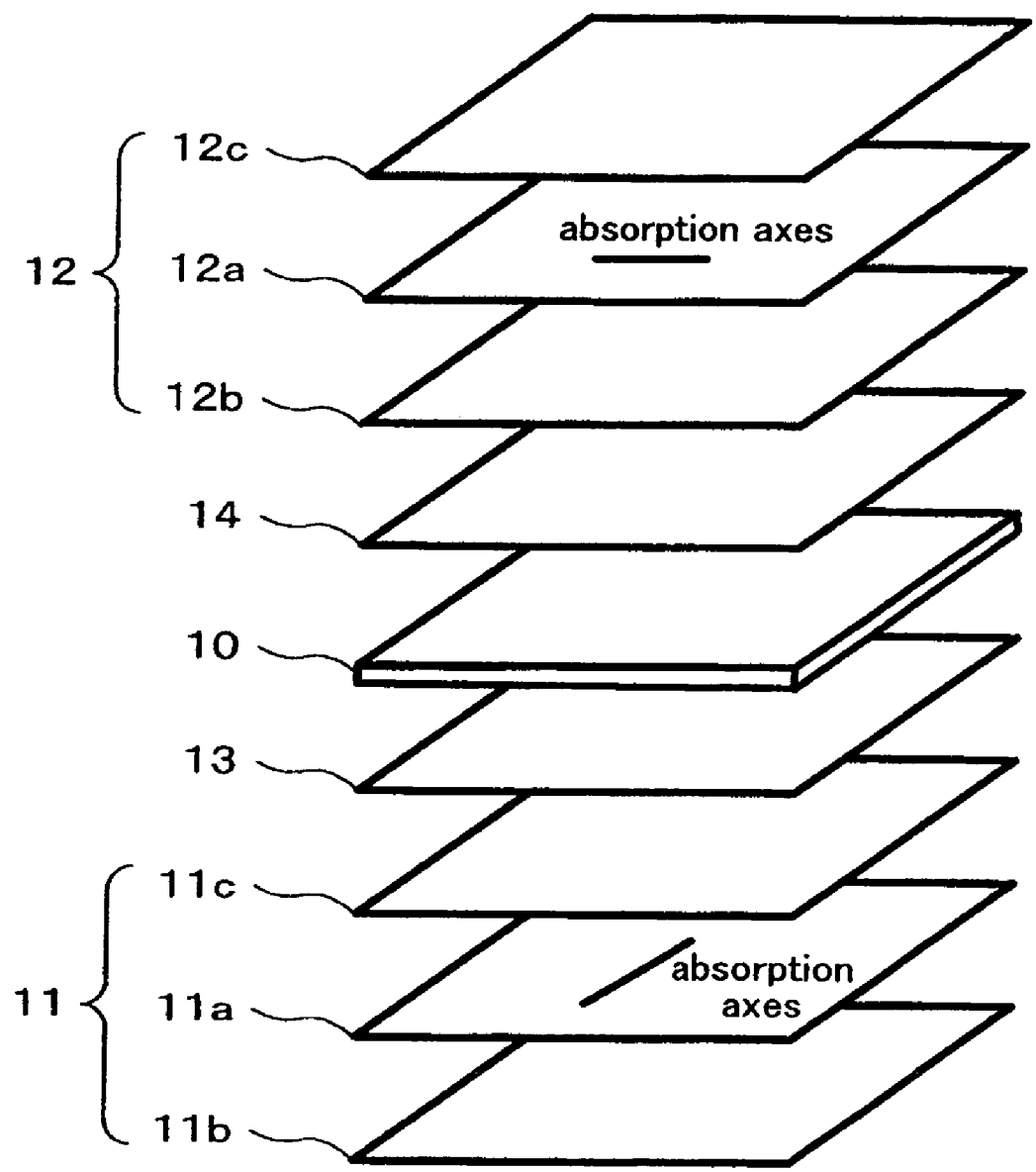
FIG. 1 is a schematic diagram showing the constitution of a known VA liquid crystal display device.
Figure 2A:
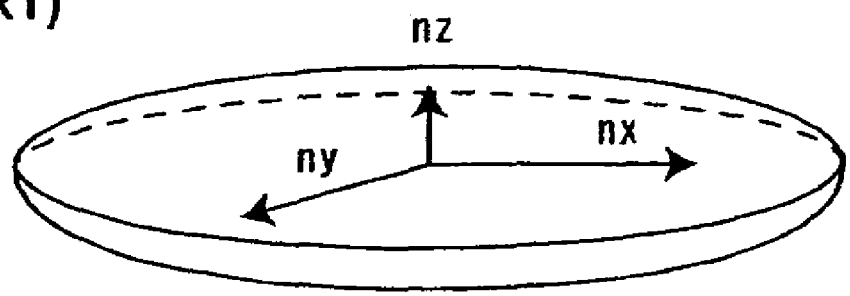
FIG. 2A is a schematic diagram showing a retardation film having a negative retardation.
Figure 2B:
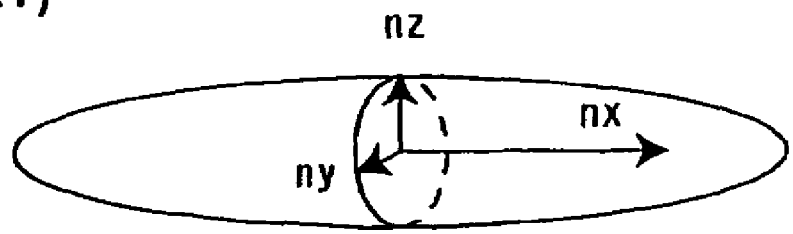
FIG. 2B is a schematic diagram showing a retardation film having a positive retardation.
Figure 3:
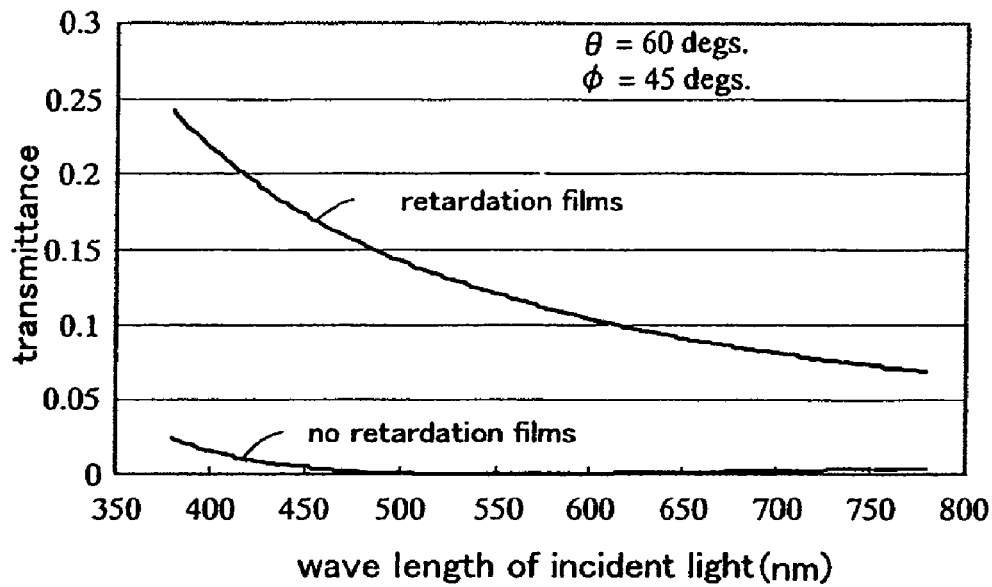
FIG. 3 is a view showing viewing angle characteristics when retardation films are used.
Figure 4:
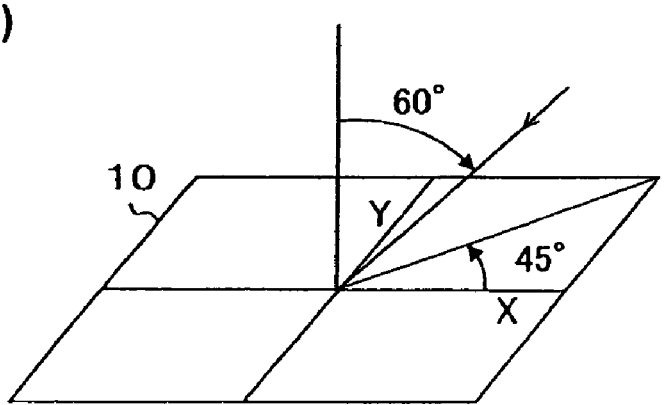
FIG. 4 is a schematic diagram showing a precondition (viewing direction) for the calculation of viewing angle characteristics shown in FIG. 3.
Figure 5:
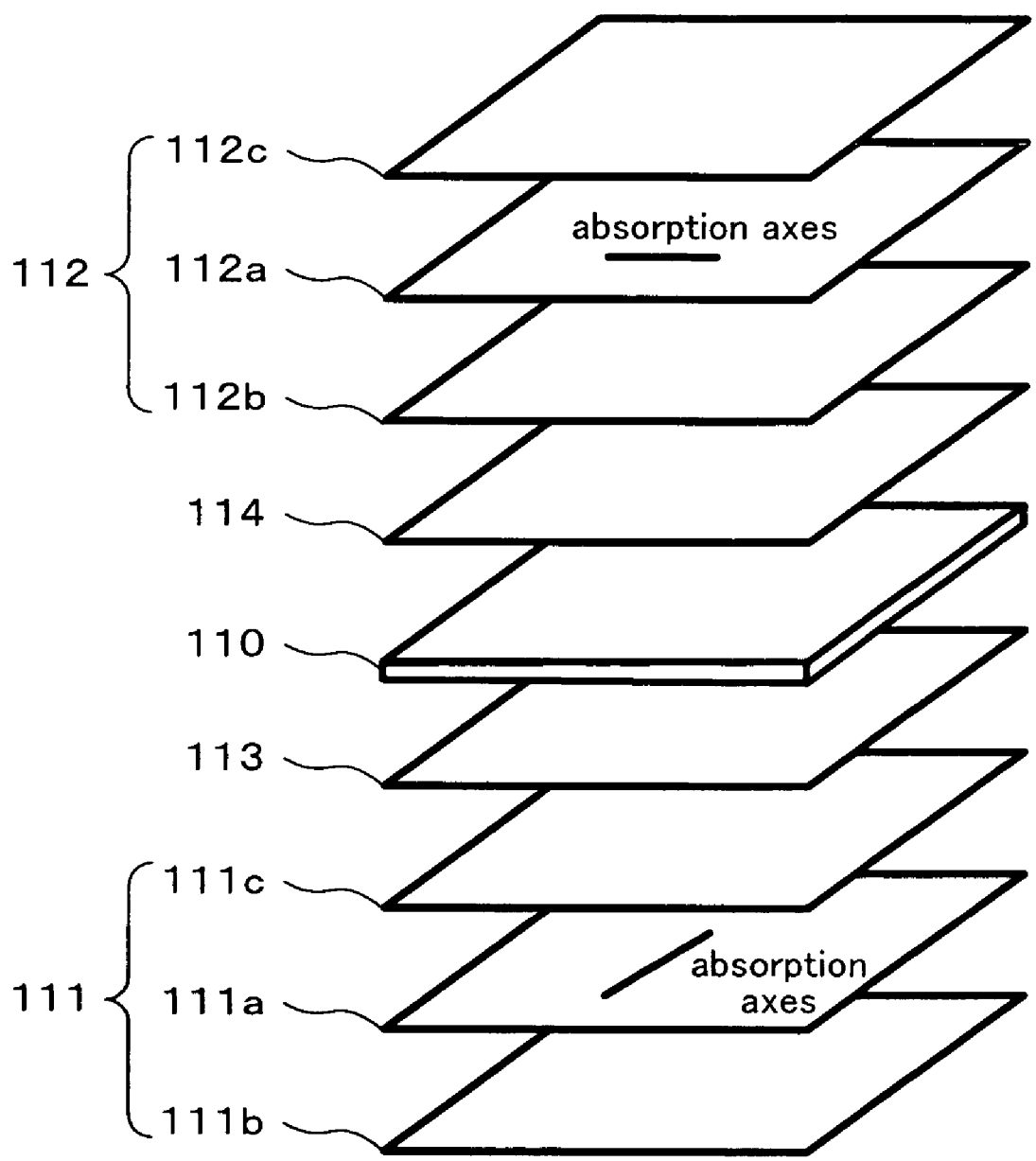
FIG. 5 is a schematic diagram showing the constitution of a liquid crystal display device of a first embodiment of the present invention.

FIG. 5 is a schematic diagram showing the constitution of a liquid crystal display device of the first embodiment of the present invention. A liquid crystal panel 110 is constituted by filling vertical alignment-type liquid crystals (liquid crystals with negative dielectric anisotropy) into the space between a TFT substrate and a counter substrate. In the present embodiment, as the liquid crystal panel 110, a multi-domain vertical alignment (MVA) liquid crystal panel having, in each picture element, four regions (domains) in which the alignment directions of liquid crystal molecules when a voltage is applied are different from each other is used. However, the liquid crystal panel 110 is not limited to the MVA type as long as the liquid crystal panel 110 uses vertical alignment-type liquid crystals.

On one side (lower side in the drawing) of the liquid crystal panel 110, a polarizing plate 111 is placed. On the other side (upper side in the drawing), a polarizing plate 112 is placed. The polarizing plate 111 has a structure in which a polarizing layer 111a is sandwiched between protective layers 111b and 111c. Similarly, the polarizing plate 112 has a structure in which a polarizing layer 112a is sandwiched between protective layers 112b and 112c. These polarizing plates 111 and 112 are placed with the absorption axes thereof oriented at right angles to each other.

A retardation film (c plate) 113 having a negative retardation is placed between the liquid crystal panel 110 and the polarizing plate 111, and a retardation film (a plate) 114 having a positive retardation is placed between the liquid crystal panel 110 and the polarizing plate 112.

The invention of the present application differs from known technologies in that the retardations of the a and c plates for the wavelength of incident light are optimized for a vertical alignment liquid crystal display device. Hereinafter, details thereof will be described.

Figure 6:
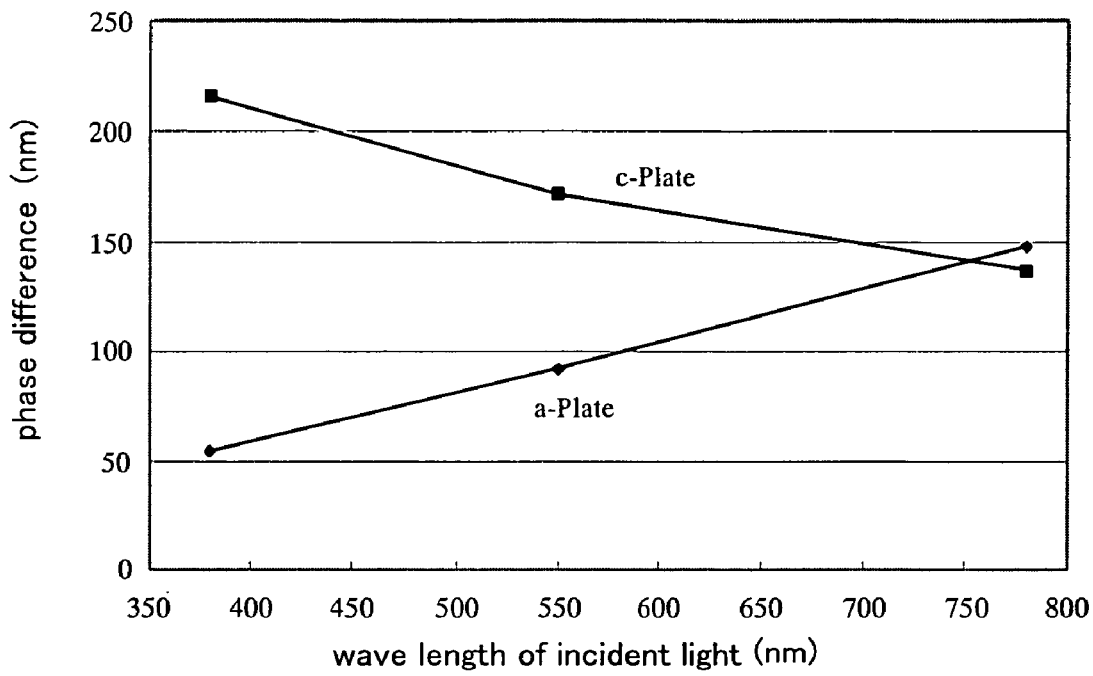
FIG. 6 is a view showing the relationship between the wavelength of incident light and the optimum value of a retardation in each of a and c plates.

The inventors of the present application found the optimum value of the retardation of each of the a and c plates for each wavelength by calculation, from the viewpoint of minimizing leakage of blue light and red light in oblique directions in black display. FIG. 6 is a view obtained when the wavelength of incident light and the optimum values of the retardations have been found for the a and c plates. Note that the horizontal axis is the wavelength of incident light, and that the vertical axis is the retardations of the a and c plates. As can be seen from this FIG. 6, in the range in which the wavelength of incident light is 380 to 780 nm (range of visible light), light leakage can be reduced to a minimum by using an a plate in which the in-plane retardation increases with increasing wavelength and using a c plate in which the negative retardation decreases with increasing wavelength.

In general, optical effect relating to a retardation is represented by $\Delta nd/\lambda$. In the case where the optical effect of a liquid crystal layer is discussed, $\Delta n$ is the refractive index anisotropy of liquid crystals, d is a cell gap, and $\lambda$ is the wavelength of incident light. The refractive index anisotropy $\Delta n$ of liquid crystals also changes depending on the wavelength of incident light, and the refractive index anisotropy $\Delta n$ becomes a smaller value as the wavelength $\lambda$ of incident light decreases. Further, in the case where the cell gap d is constant, the value $\Delta nd/\lambda$ increases as the wavelength $\lambda$ of incident light decreases, and the value $\Delta nd/\lambda$ decreases as the wavelength $\lambda$ of incident light increases.

The c plate is used for canceling the optical effect of the liquid crystal layer. The optical effect of the liquid crystal layer, which is represented by $\Delta nd/\lambda$, increases as the wavelength $\lambda$ of incident light decreases. Accordingly, in order to cancel this effect, it is necessary to increase the optical effect of the c plate, i.e. the negative retardation Rth (Rth=((nx+ny)/2−nz)×thickness of film), as the wavelength $\lambda$ of incident light decreases. Accordingly, as shown in FIG. 6, the optimum value for the c plate becomes a larger value as the wavelength $\lambda$ of incident light decreases.

On the other hand, the a plate is used not for compensating optical effect but for rotating the direction of polarization of light. In this case, $\Delta nd/\lambda$ ($\Delta n$ is the anisotropy of the film, d is the thickness of the film, $\lambda$ is the wavelength of light) which is the optical effect of the film itself needs to be adjusted so that the optical effect does not change depending on the wavelength $\lambda$ of incident light. That is, as shown in FIG. 6, $\Delta n$ needs to be increased in the case where the wavelength $\lambda$ of incident light is long.

As described above, since the actions of the a and c plates are different from each other, the wavelength dependences of required optimum optical effects are opposite in terms of the wavelength of incident light.

Figure 7:
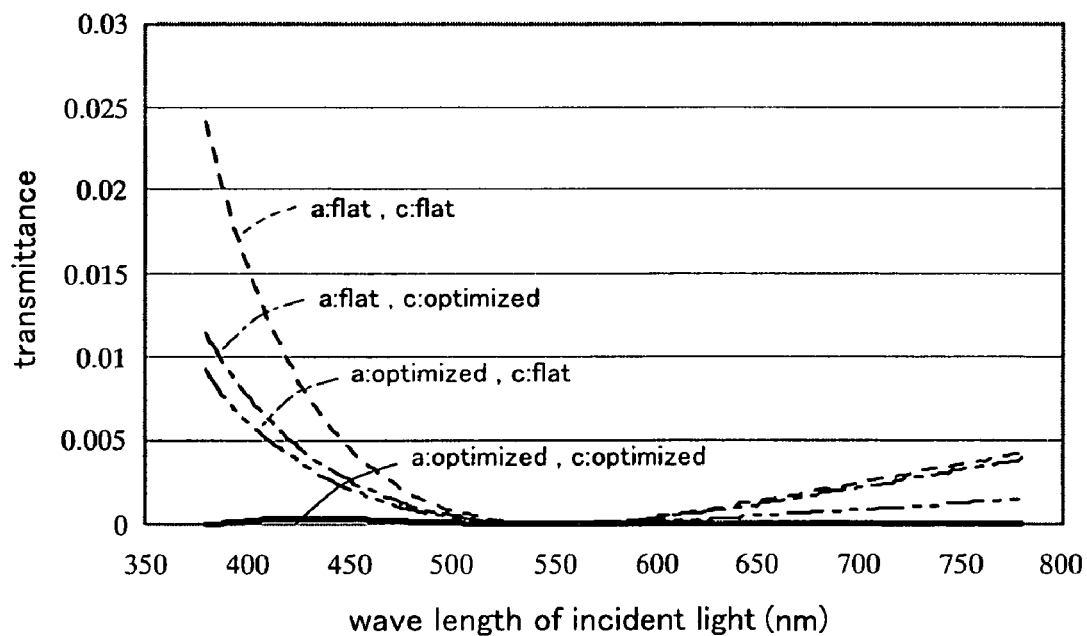
FIG. 7 is a view showing optimized effects of the a and c plates.

FIG. 7 is a view showing optimized effects of the a and c plates with the wavelength of input light on the horizontal axis and the transmittance on the vertical axis. In FIG. 7, the dashed line (labeled with the wording "a: flat, c: flat" in the drawing) indicates the relationship between the wavelength of incident light and the transmittance for the case where both the a and c plates have no wavelength dependences (characteristics are flat), the chain line (labeled with the wording "a: flat, c: optimized" in the drawing) indicates the relationship between the wavelength of incident light and the transmittance for the case where the c plate is optimized and where the a plate has no wavelength dependence, the two-dot chain line (labeled with the wording "a: optimized, c: flat" in the drawing) indicates the relationship between the wavelength of incident light and the transmittance for the case where the a plate is optimized and where the c plate has no wavelength dependence, and the solid line (labeled with the wording "a: optimized, c: optimized" in the drawing) indicates the relationship between the wavelength of incident light and the transmittance for the case where both the a and c plates are optimized.

As can be seen from this FIG. 7, light leakage can be reduced compared to known technologies by optimizing any one of the a and c plates as shown in FIG. 6. Further, in the case where both the a and c plates are optimized, leakage of blue light and red light can be further reduced.

Figure 8A:
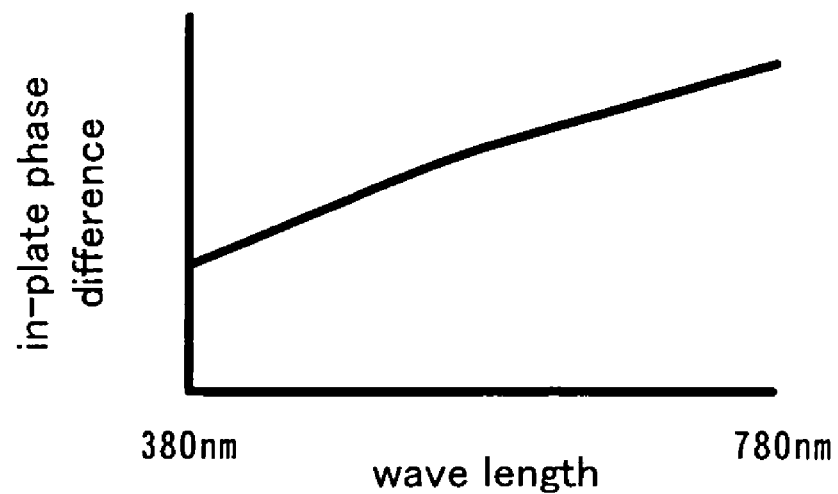
FIG. 8A is a view showing the relationship between a wavelength and an in-plane retardation in a reciprocal dispersion film used as the a plate.
Figure 8B:
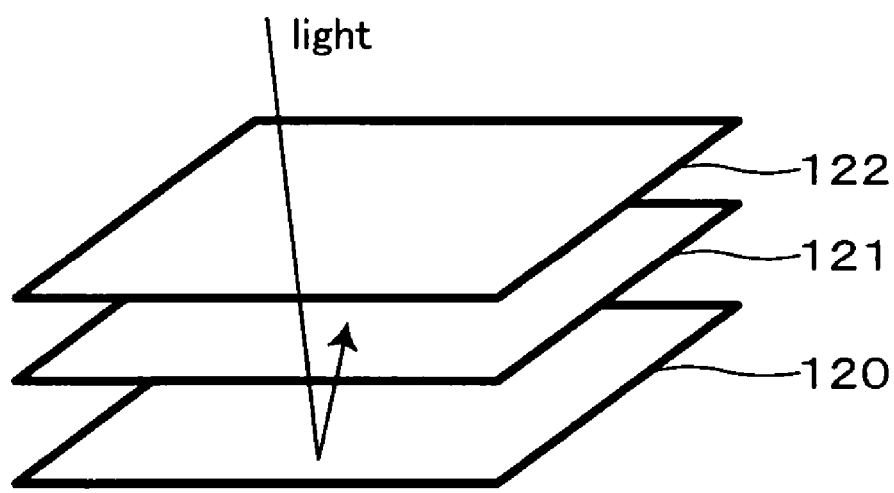
FIG. 8B is a schematic diagram showing an example of a $\lambda/4$ wavelength plate constituted by combining a reciprocal dispersion film with a polarizing plate.

In the present embodiment, a reciprocal dispersion film in which the in-plane retardation increases with increasing wavelength λ as shown in FIG. 8A is used as the a plate. As shown in FIG. 8B, a reciprocal dispersion film 121 has been heretofore used as a λ/4 wavelength plate. The reciprocal dispersion film 121 constitutes a circularly polarizing plate in combination with a polarizing plate 122, and is used as an antireflection film for preventing the reflection of light from a reflecting plate 120. An antireflection film having such a structure is used in a reflective liquid crystal display device. It has been known that a viewing angle in black display is widened if an antireflection film is placed in the front of a reflective liquid crystal display device.

As described above, a reciprocal dispersion film has been heretofore used as an antireflection film. However, in the present embodiment, a reciprocal dispersion film is used as the a plate. Reciprocal dispersion films usable as the a plate include, for example, a WRF film manufactured by Teijin Limited.

Figure 9:
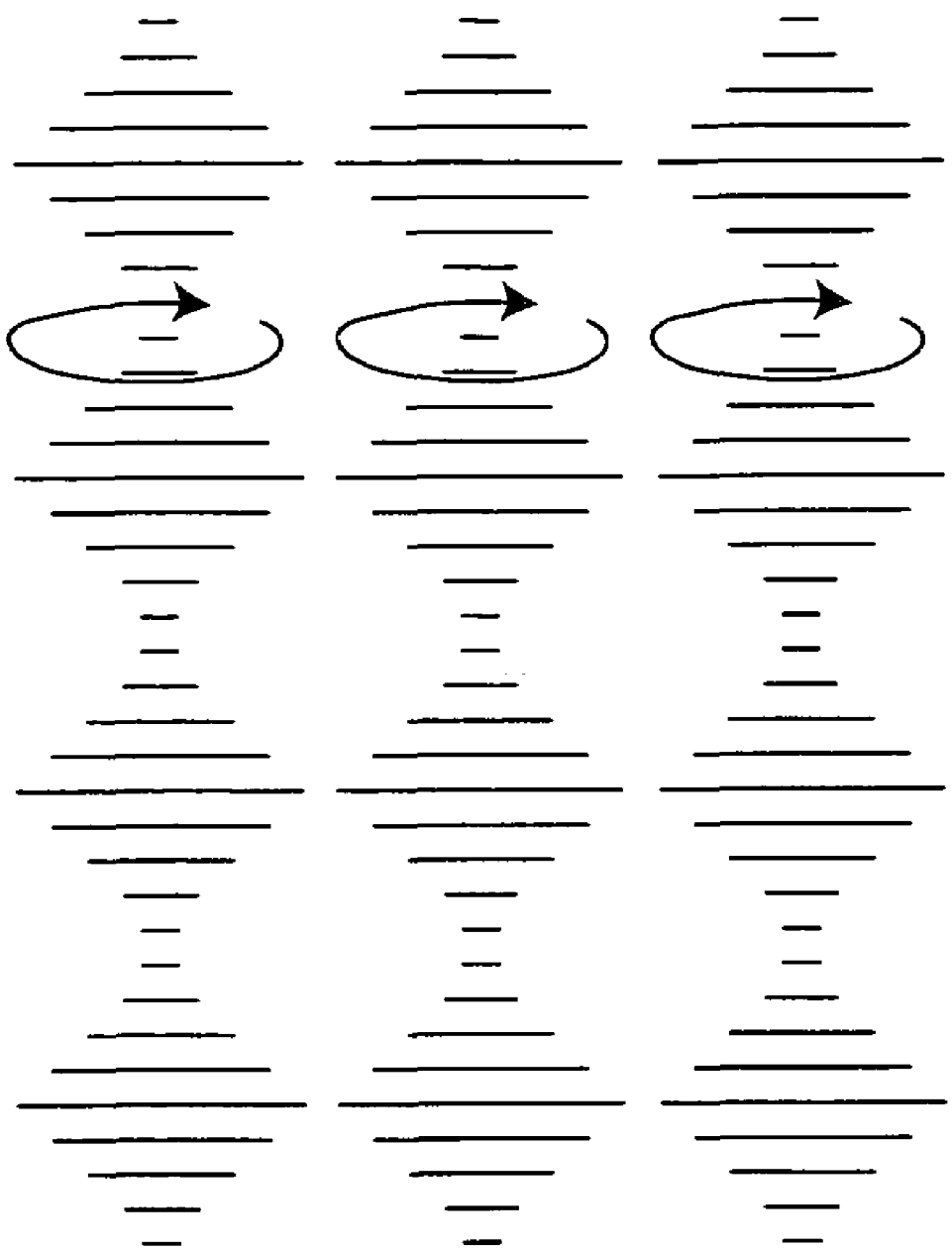
FIG. 9 is a schematic diagram showing the spiral structure of cholesteric liquid crystals used for the c plate.

On the other hand, for the c plate, one which uses liquid crystals aligned horizontally is suitable for the purpose of compensation because the liquid crystal layer of the liquid crystal panel 110 is aligned vertically. Accordingly, in the present embodiment, cholesteric liquid crystals having a spiral structure as shown in FIG. 9 is used for the c plate.

Here, the result of examining the relationship between a deviation from an optimum solution and display characteristics for the a and c plates will be described. The refractive index anisotropy of the liquid crystals has a wavelength dependence, and this trend is common to almost all liquid crystal materials.

From FIG. 6, the optimum in-plane retardation of the a plate is represented by the following equation (1):

$$\text{optimum in-plane retardation} = 0.235 \times \text{wavelength }(\lambda) - 35.3 \quad (1)$$

Further, from FIG. 6, the optimum negative retardation of the c plate is represented by the following equation (2):

$$\text{optimum negative retardation} = -0.1975 \times \text{wavelength }(\lambda) + 291.05 \quad (2)$$

After the inventors of the present application further pursued the experiment, it has been revealed that the optimum value for the a plate is influenced by a cellulose triacetate (TAC) film used as a protective film for the polarizing plate adjacent to the a plate. Further, by extending the aforementioned equation (1), the knowledge that the optimum in-plane retardation of the a plate is represented by the following equation (3) has been obtained:

$$\text{optimum in-plane retardation} = 0.235 \times \lambda - (RTAC-50)/2 - 35 = 0.235 \times \lambda - RTAC/2 - 10 \quad (3)$$

where RTAC is the negative retardation of the TAC film, which is a protective layer, at the green wavelength, and λ is the wavelength of incident light.

Further, after various experiments were conducted, it has been revealed that display characteristics can be improved compared to known technologies when the in-plane retardation is in the range represented by the following equation (4):

$$\text{in-plane retardation (nm)} = (0.235 \pm 0.02) \times \lambda - RTAC/2 - 10 \pm 20 \quad (4)$$

Moreover, the optimum negative retardation of the c plate depends on Δnd of the liquid crystal layer. The optimum negative retardation of the c plate is represented by the following equation (5):

$$\text{optimum negative retardation} = -0.1975 \times \lambda + RLCG + 55 - RTAC \times 2 \quad (5)$$

where RTAC is the negative retardation of the protective layer used for the polarizing plate at the green wavelength, RLCG is Δnd of the liquid crystal layer at the green wavelength, and λ is the wavelength of light.

After various experiments were further conducted, it has been revealed that display characteristics can be improved compared to known technologies when the negative retardation is in the range represented by the following equation (6):

$$\text{negative retardation (nm)} = -(0.2 \pm 0.02) \times \lambda + RLCG + 55 - RTAC \times 2 \pm 30 \quad (6)$$

As described above, in the present embodiment, since the retardations of the a and c plates for the wavelength of input light are optimized, light leakage of blue light and red light in oblique directions are further reduced compared to known technologies. Thus, in the liquid crystal display device of the present embodiment, favorable display characteristics can be obtained compared to known technologies.

MODIFIED EXAMPLE 1

Figure 10:
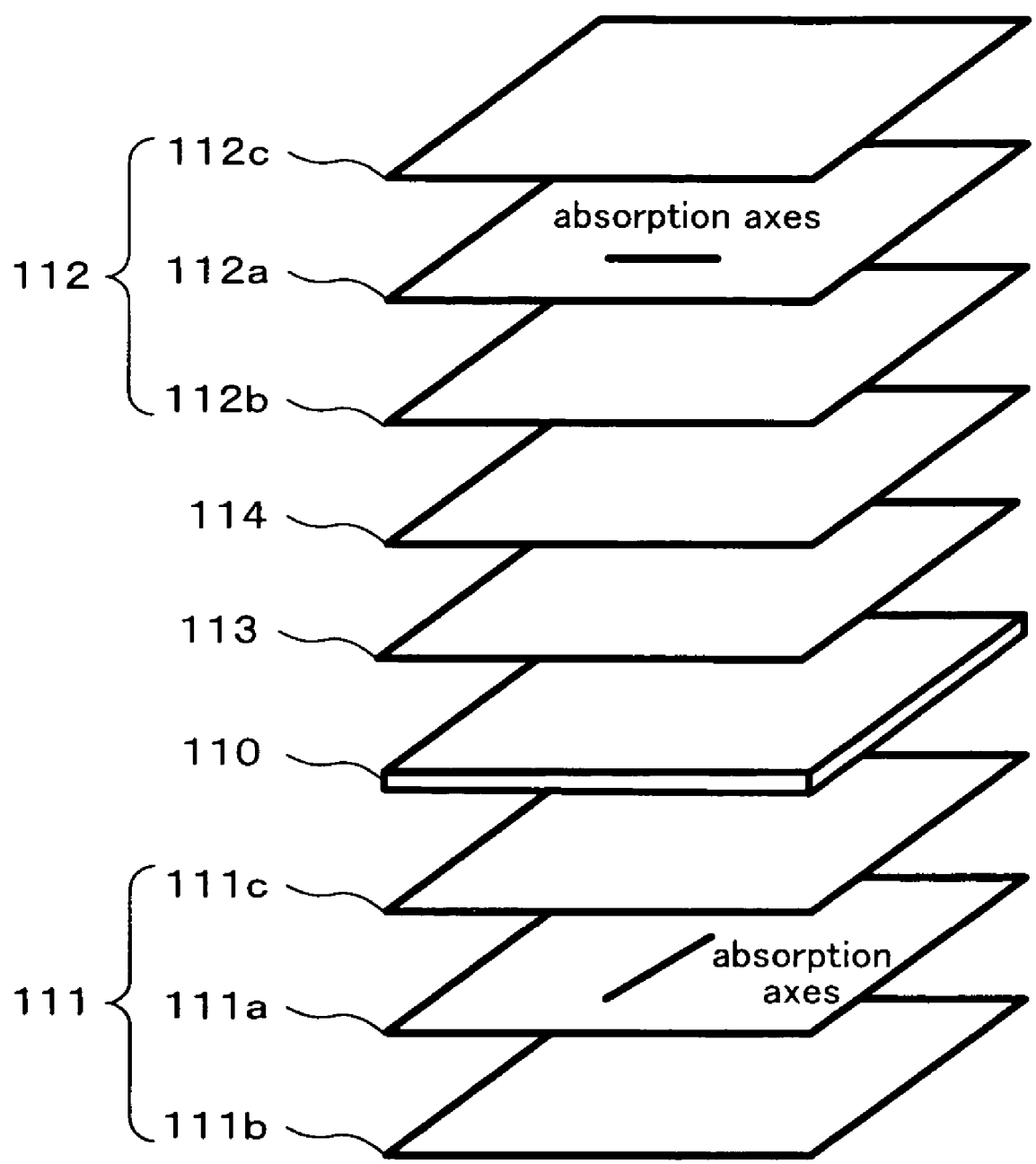
FIG. 10 is a schematic diagram showing modified example 1 of the first embodiment.

FIG. 10 is a schematic diagram showing modified example 1 of the present embodiment. In this FIG. 10, the same components as those in FIG. 5 are denoted by the same reference numerals and codes, and will not be further described in detail.

In modified example 1, the retardation film (c plate) 113 and the retardation film (a plate) 114 are placed between the liquid crystal panel 110 and the upper polarizing plate 112 in such a manner that the retardation film 113 and the retardation film 114 are stacked in this order from the liquid crystal panel 110 side. The in-plane retardation of the retardation film 114 is set in accordance with the aforementioned equation (3) or (4), and the negative retardation of the retardation film 113 is set in accordance with the aforementioned equation (5) or (6).

In such a liquid crystal display device, effects similar to those of the liquid crystal display device of the aforementioned embodiment can also be obtained.

MODIFIED EXAMPLE 2

Figure 11:
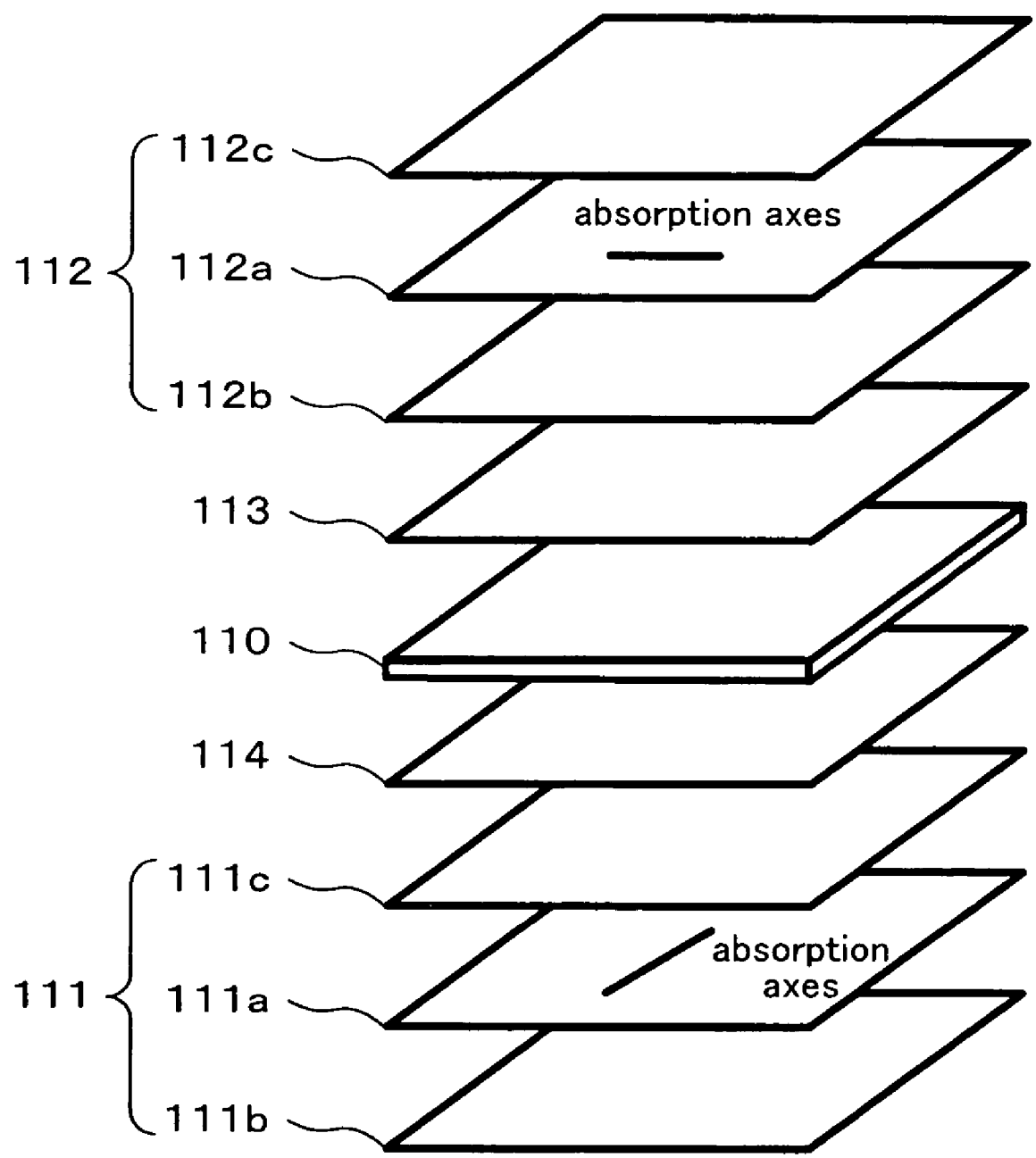
FIG. 11 is a schematic diagram showing modified example 2 of the first embodiment.

FIG. 11 is a schematic diagram showing modified example 2 of the present embodiment. In this FIG. 11, the same components as those in FIG. 5 are denoted by the same reference numerals and codes, and will not be further described in detail.

In modified example 2, the retardation film (a plate) 114 is placed between the liquid crystal panel 110 and the lower polarizing plate 111, and the retardation film (c plate) 113 is placed between the liquid crystal panel 110 and the upper polarizing plate 112. The in-plane retardation of the retardation film 114 is set in accordance with the aforementioned equation (3) or (4), and the negative retardation of the retardation film 113 is set in accordance with the aforementioned equation (5) or (6).

In such a liquid crystal display device, effects similar to those of the liquid crystal display device of the aforementioned embodiment can also be obtained.

MODIFIED EXAMPLE 3

Figure 12:
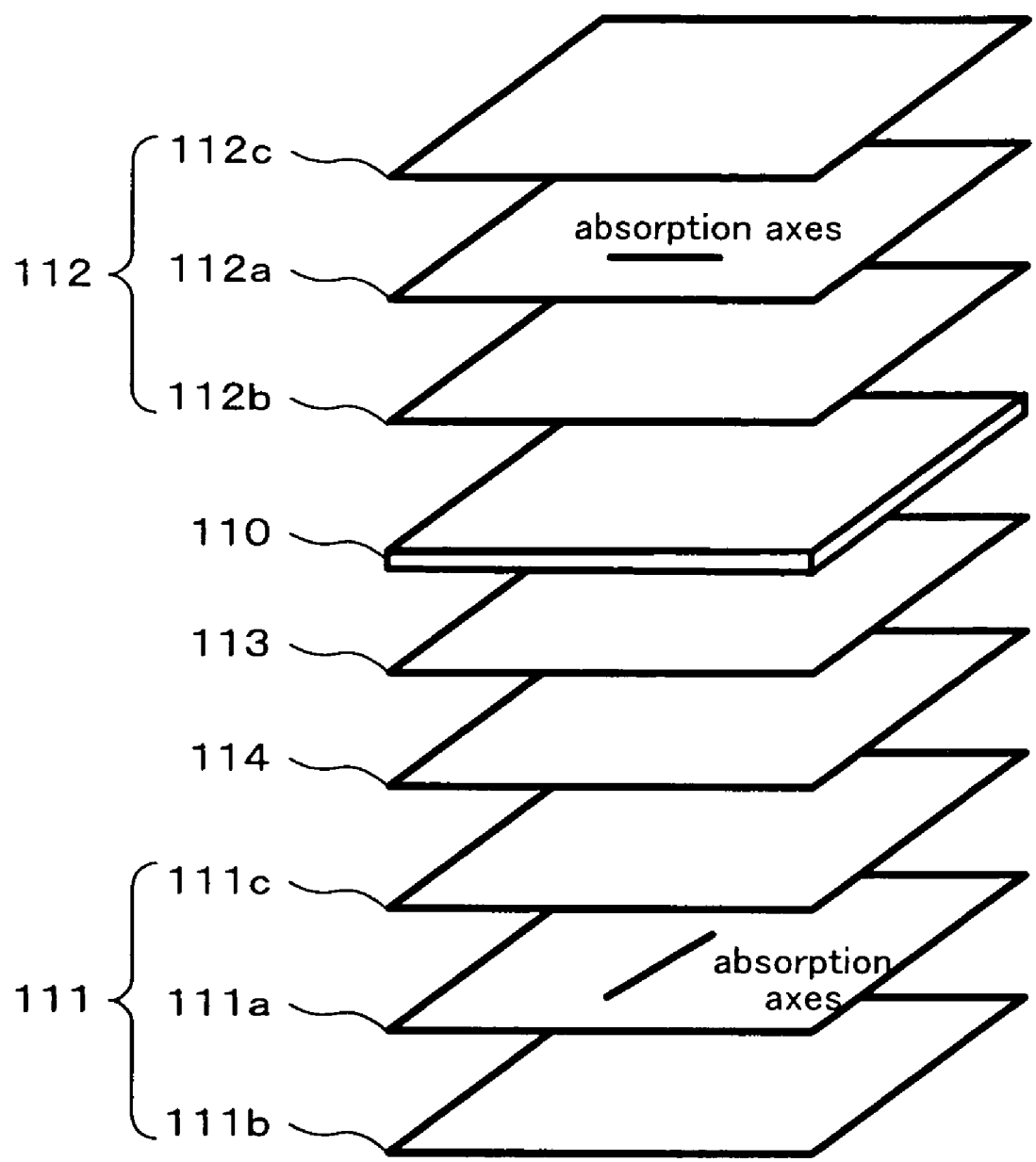
FIG. 12 is a schematic diagram showing modified example 3 of the first embodiment.

FIG. 12 is a schematic diagram showing modified example 3 of the present embodiment. In this FIG. 12, the same components as those in FIG. 5 are denoted by the same reference numerals and codes, and will not be further described in detail.

In modified example 3, the retardation film (a plate) 114 and the retardation film (c plate) 113 are placed between the liquid crystal panel 110 and the lower polarizing plate 111 in such a manner that the retardation film 114 and the retardation film 113 are stacked in this order from the lower polarizing plate 111 side. The in-plane retardation of the retardation film 114 is set in accordance with the aforementioned equation (3) or (4), and the negative retardation of the retardation film 113 is set in accordance with the aforementioned equation (5) or (6).

In such a liquid crystal display device, effects similar to those of the liquid crystal display device of the aforementioned embodiment can also be obtained.

Second Embodiment

Figure 13:
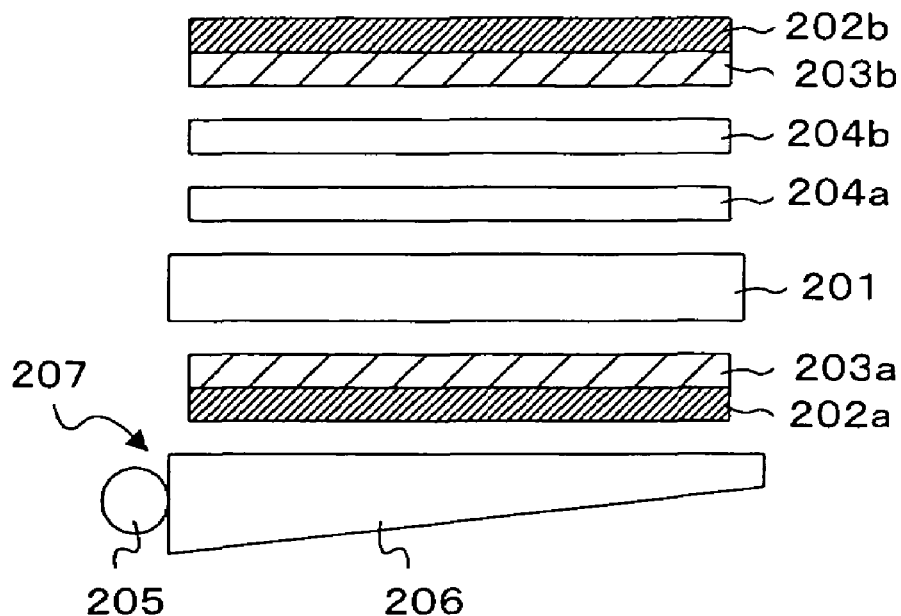
FIG. 13 is a schematic diagram showing the constitution of a liquid crystal display device of a second embodiment of the present invention.

FIG. 13 is a schematic diagram showing the constitution of a liquid crystal display device of a second embodiment of the present invention. Note that, in the present embodiment, an example is shown in which the present invention is applied to an MVA liquid crystal display device.

The liquid crystal display device of the present embodiment includes a liquid crystal panel 201, polarizing plates 202a and 202b, circular polarizers 203a and 203b, refractive index anisotropy compensation films 204a and 204b, and a backlight 207.

The liquid crystal panel 201 is constituted in such a manner that liquid crystals with negative dielectric anisotropy are sandwiched between a TFT substrate and a counter substrate. On the TFT substrate, a picture element electrode, a TFT, and the like are formed for each picture element. On the counter substrate, a common electrode, color filters, and the like are formed. Further, on at least one of the TFT substrate and the counter substrate, slits of the picture element electrodes or the counter electrode, or protrusions are provided as domain regulation structures. The domain regulation structures are intended to form, in each picture element, two or more regions in which the tilt directions of liquid crystal molecules are different from each other when a voltage is applied.

The backlight 207 includes a fluorescent tube 205 and a light guiding plate 206, and is placed on one side (lower side in FIG. 13) of the liquid crystal panel 201. Light emanating from the fluorescent tube 205 enters into the light guiding plate 206, and is reflected toward the liquid crystal panel 201 by a reflecting surface of the light guiding plate 206.

The polarizing plate 202a and the circular polarizer 203a are placed between the liquid crystal panel 201 and the backlight 207. Further, the polarizing plate 202b and the circular polarizer 203b are placed on the other side (upper side in FIG. 13) of the liquid crystal panel 201, and the refractive index anisotropy compensation films 204a and 204b are placed between the liquid crystal panel 201 and the circular polarizer 203b. The refractive index anisotropy compensation films 204a and 204b are kinds of retardation films, and are films for compensating the refractive index anisotropy of liquid crystals contained in the liquid crystal panel 201 as described later. As the refractive index anisotropy compensation films 204a and 204b, cellulose triacetate (TAC) films, polycarbonate films, ARTON films manufactured by JSR Corporation, ZEONOR films manufactured by ZEON Corporation, norbornene films, or the like can be used.

As shown in this FIG. 13, the liquid crystal display device of the present embodiment has the feature that the refractive index anisotropy compensation films 204a and 204b are placed only on the opposite side of the liquid crystal panel 201 from the backlight 207. The reason for this will be described below.

Compared to TN liquid crystal display devices, MVA liquid crystal display devices have excellent viewing angle characteristics, but have the disadvantage that brightness in white display is low. This is because liquid crystal molecules tilt in directions deviated from an optimum orientation in the vicinities of slits provided in picture element electrodes or a counter electrode, or of protrusions, the slits or the protrusions being domain regulation structures. In this case, the optimum tilt orientation of the liquid crystal molecules means the orientation equal to the orientation of the transmission axis of a polarizing plate. If the tilt orientations of the liquid crystal molecules are deviated from the transmission axis of the polarizing plate, light transmittance in white display is reduced.

Figure 14:
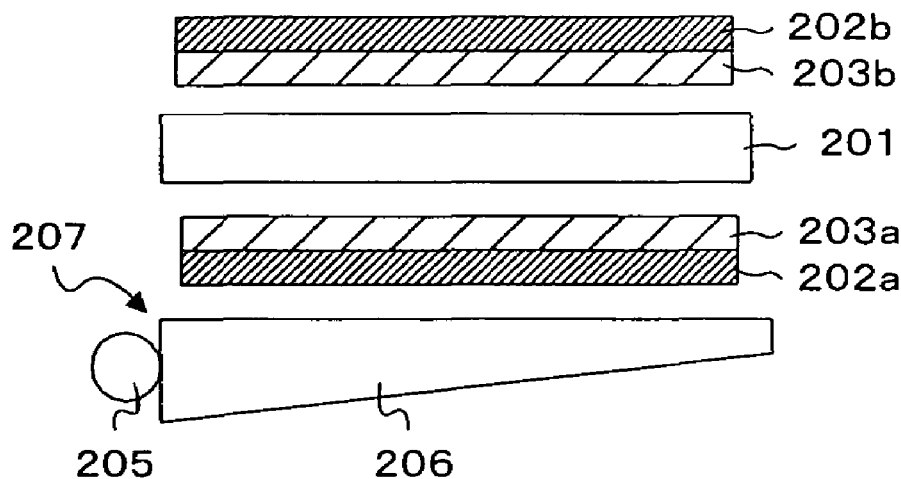
FIG. 14 is a schematic diagram showing an example of a liquid crystal display device in which circular polarizers are respectively placed between a liquid crystal panel and polarizing plates placed on both sides of the liquid crystal panel.

In order to eliminate the above-described disadvantage, it can be considered that, as shown in FIG. 14, the circular polarizers (circularly polarizing plates) 203a and 203b are placed between the liquid crystal panel 201 and the polarizing plates (linear polarizing plates) 202a and 202b placed on both sides of the liquid crystal panel 201, respectively. In a liquid crystal display device of this type, light passing through the liquid crystal layer becomes circularly polarized light. As a result, there is almost no influence of the deviation of the tilt orientations of the liquid crystal molecules from the optimum tilt orientation in the vicinities of the domain regulation structures (protrusions or slits). Accordingly, light transmittance improves, and brightness in white display increases.

However, simple use of the circular polarizers has the disadvantage that the viewing angle is narrowed compared to typical MVA liquid crystal display devices. Accordingly, it is necessary to widen the viewing angle by compensating the negative refractive index anisotropy of the liquid crystals. For such a purpose, used is a retardation film with positive refractive index anisotropy, i.e. a polymer film in which the relationship $nx \geqq ny > nz$ is satisfied when the refractive indices in two orthogonal directions parallel to the film plane (X and Y directions) are respectively denoted by nx and ny and when the refractive index in the thickness direction is denoted by nz. In the present application, such a polymer film is referred to as a refractive index anisotropy compensation film.

The compensation capability R of the refractive index anisotropy compensation film in the direction perpendicular to the liquid crystal panel is represented by the following equation (7):

$$R = ((nx+ny)/2 - nz) \times d \qquad (7)$$

Here, d is the thickness of the refractive index anisotropy compensation film.

Incidentally, a polarizing plate (linear polarizing plate) used in a liquid crystal display device includes a polyvinyl alcohol (PVA) film which transmits only light oscillating in a predetermined direction, and polymer films (hereinafter referred to as protective films) which are attached to both sides of the PVA film and which protect the PVA film against external stress, humidity, and the like. Since the protective films also have compensation capabilities, the relationship between the retardation RLC of the liquid crystals and the compensation capability R of the refractive index anisotropy compensation film preferably satisfies the following inequality (8):

$$RLC > a \times R$$

Here, a is the number of refractive index anisotropy compensation films. The compensation capabilities R of refractive index anisotropy compensation films generally manufactured at present are within the range of 30 nm≦R≦150 nm.

It is preferable that the refractive index nx of the refractive index anisotropy compensation film in the X direction and the refractive index ny thereof in the Y direction have the same value. However, for manufacturing reasons, it is very difficult to make the refractive index nx in the X direction and the refractive index ny in the Y direction have the same value. Accordingly, in typical refractive index anisotropy compensation films, there occurs a retardation in an in-plane direction due to the difference between the refractive index nx in the X direction and the refractive index ny in the Y direction. In this case, by placing two or more refractive index anisotropy compensation films in such a manner that the nx axes thereof alternately intersect at right angles (in crossed Nicols), the in-plane retardation can be self-compensated, and the influence thereof can be made less prone to appear.

Figure 15:
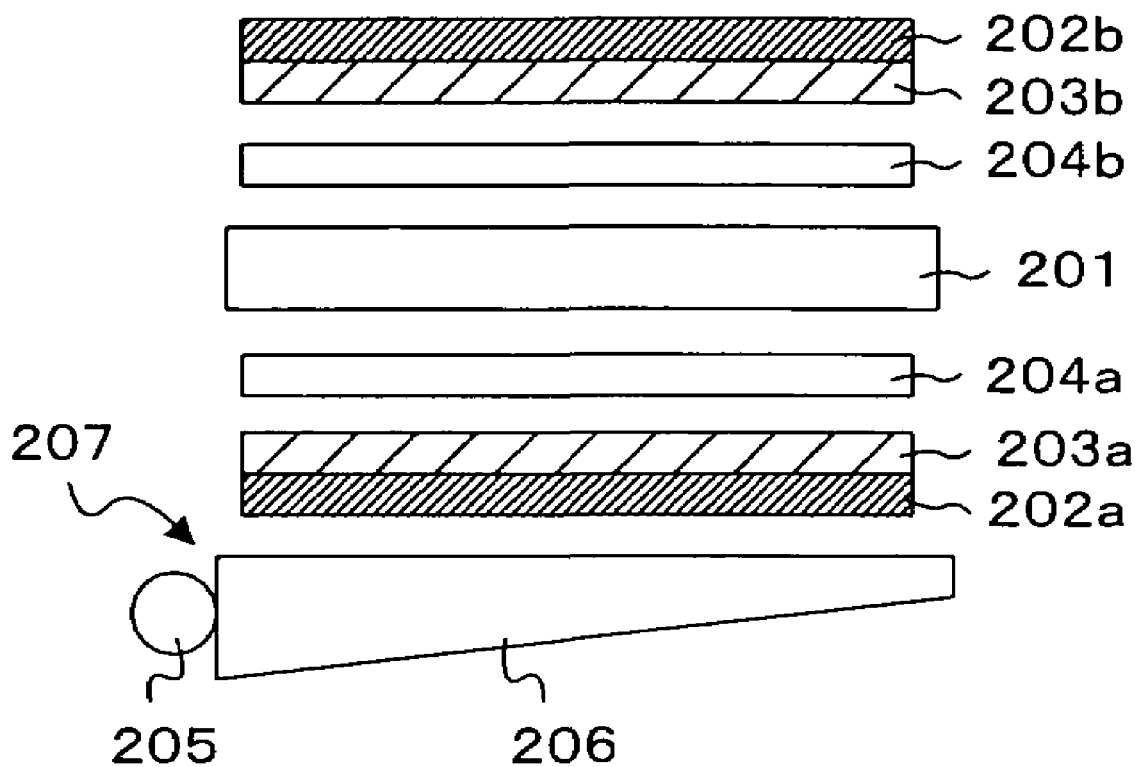
FIG. 15 is a schematic diagram showing an example of a liquid crystal display device which uses two refractive index anisotropy compensation films.

FIG. 15 is a schematic diagram showing a liquid crystal display device (reference example) which uses two refractive index anisotropy compensation films. In this liquid crystal display device, on one side (light incident side) of the liquid crystal panel 201, the refractive index anisotropy compensation film 204a, the circular polarizer 203a, and the polarizing plate 202a are placed in this order from the liquid crystal panel 201 side. Further, on the other side (light exit side) of the liquid crystal panel 201, the refractive index anisotropy compensation film 204b, the circular polarizer 203b, and the polarizing plate 202b are placed in this order from the liquid crystal panel 201 side.

In the liquid crystal display device in which the respective circular polarizers 203a and 203b and the respective refractive index anisotropy compensation films 204a and 204b are placed between the liquid crystal panel 201 and the respective polarizing plates 202a and 202b on both sides of the liquid crystal panel 201 as shown in this FIG. 15, it is possible to realize favorable viewing, angle characteristics while suppressing a decrease in brightness in white display.

However, experiments and researches by the inventors of the present application have revealed that unevenness of display is prone to occur in a liquid crystal display device in which the refractive index anisotropy compensation films 204a and 204b are placed on both sides of the liquid crystal panel 201 as shown in FIG. 15. Details of this will be described below.

A refractive index anisotropy compensation film expands or contracts due to a change in temperature and influences display characteristics of a liquid crystal display device. Accordingly, for example, at a temperature of 60° C., the amount of light transmission in black display increases, and there occurs a phenomenon called black level degradation in which portions that should be originally black look gray, even if an image can be displayed well at room temperature. When the temperature of the entire refractive index anisotropy compensation film increases, the entire panel produces display in gray. However, when the refractive index anisotropy compensation film locally has a high-temperature region or a low-temperature region, unevenness of display occurs, and deterioration in display characteristics can be easily recognized by visual observation.

In a typical transmissive liquid crystal display device, a fluorescent tube (cold-cathode tube) is used as a light source of a backlight. Since the fluorescent tube generates heat as well as light, temperature rises in an area close to the fluorescent tube. Thus, in the portion of the refractive index anisotropy compensation film which is close to the fluorescent tube, temperature rises, and the amount of light transmission increases. As a result, the portion close to the fluorescent tube becomes a region which looks gray. On the other hand, in the portion of the refractive index anisotropy compensation film which is away from the fluorescent tube, temperature hardly rises. Accordingly, the difference in transmittance between the portion away from the fluorescent tube and the portion close to the fluorescent tube becomes large, and unevenness of display occurs. Thus, display quality significantly deteriorates.

Hereinafter, the result of measuring the temperature of a liquid crystal panel with a backlight turned on in a transmissive liquid crystal display device which uses the backlight will be described.

Figure 16:
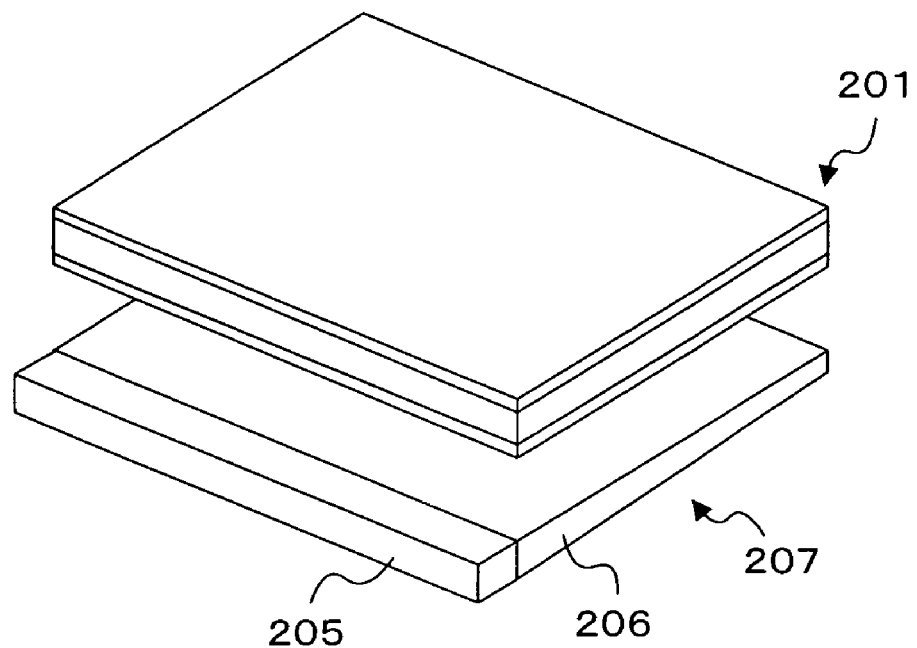
FIG. 16 is a schematic diagram showing the state of a liquid crystal panel at the time of temperature measurement.

FIG. 16 is a schematic diagram showing the state of the liquid crystal panel at the time of temperature measurement. A backlight 207 including a fluorescent tube 205 and a light guiding plate 206 was placed under the liquid crystal panel 201. Then, at the surface of the liquid crystal panel 201 which is adjacent to the light guiding plate 206, the temperature of the portion in the vicinity of the fluorescent tube 205 and the temperature of the central portion of the panel were measured, and, at the opposite surface of the liquid crystal panel 201 from the light guiding plate 206, the temperature of the portion in the vicinity of the fluorescent tube 205 and the temperature of the central portion of the panel were measured. The result is shown in the following table 1.

TABLE 1

|  | Vicinity of Fluorescent Tube | Panel Center |
| --- | --- | --- |
| Surface adjacent to Light Guiding Plate | 39.2° C. | 21.7° C. |
| Opposite Surface | 34.8° C. | 21.5° C. |

From this table 1, it can be seen that the temperature of the portion in the vicinity of the fluorescent tube 205 at the surface of the liquid crystal panel 201 which is adjacent to the light guiding plate 206 is very high and that there is a temperature difference of 4° C. or more between the surface on the light guiding plate 206 side and the surface on the opposite side even in the vicinity of the fluorescent tube 205. From this, it can be seen that deterioration in display characteristics can be suppressed if the refractive index anisotropy compensation film, which greatly influences display characteristics due to temperature change, is placed on the opposite side of the liquid crystal panel 201 from the backlight 207 as in the present embodiment.

Figure 17:
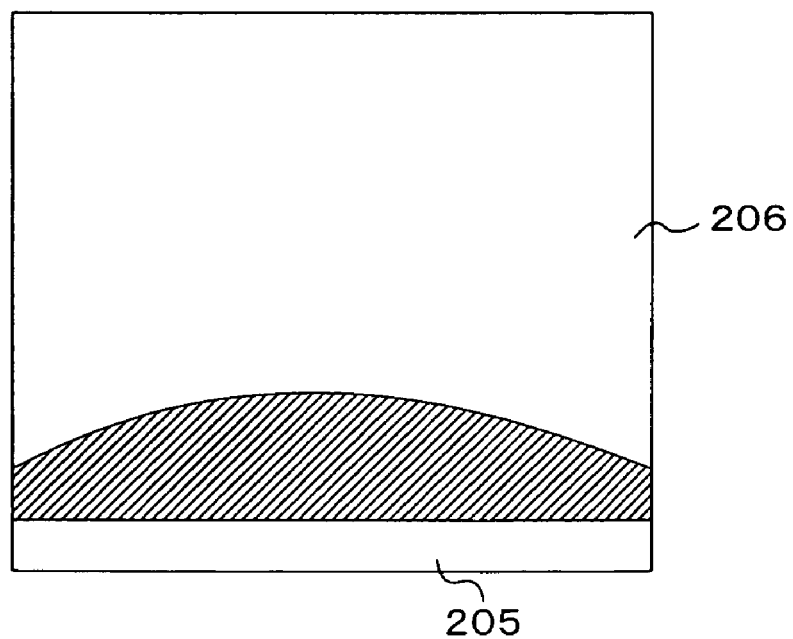
FIG. 17 is a schematic diagram showing the temperature distribution in a light guiding plate.

Incidentally, table 1 shows the result for the case where a backlight is used. However, in the case of a frontlight, which is used in part of reflective liquid crystal display devices, it is also estimated that the temperature of the portion close to the fluorescent tube at the front surface of the liquid crystal panel is highest similarly to the above. Further, as shown in the plan view of FIG. 17, it is estimated that the temperature of the portion of the light guiding plate 206 which corresponds to the middle of the fluorescent tube 205 becomes highest.

Hereinafter, the result of actually manufacturing the liquid crystal display device of the present embodiment and comparing display characteristics thereof and those of comparative examples will be described.

As a test body, a liquid crystal panel of 15-inch XGA (1024×768 pixels, 297 μm pixel pitch) was prepared. This liquid crystal panel has a structure in which liquid crystals with negative dielectric anisotropy are contained between a TFT substrate and a counter substrate.

Figure 18:
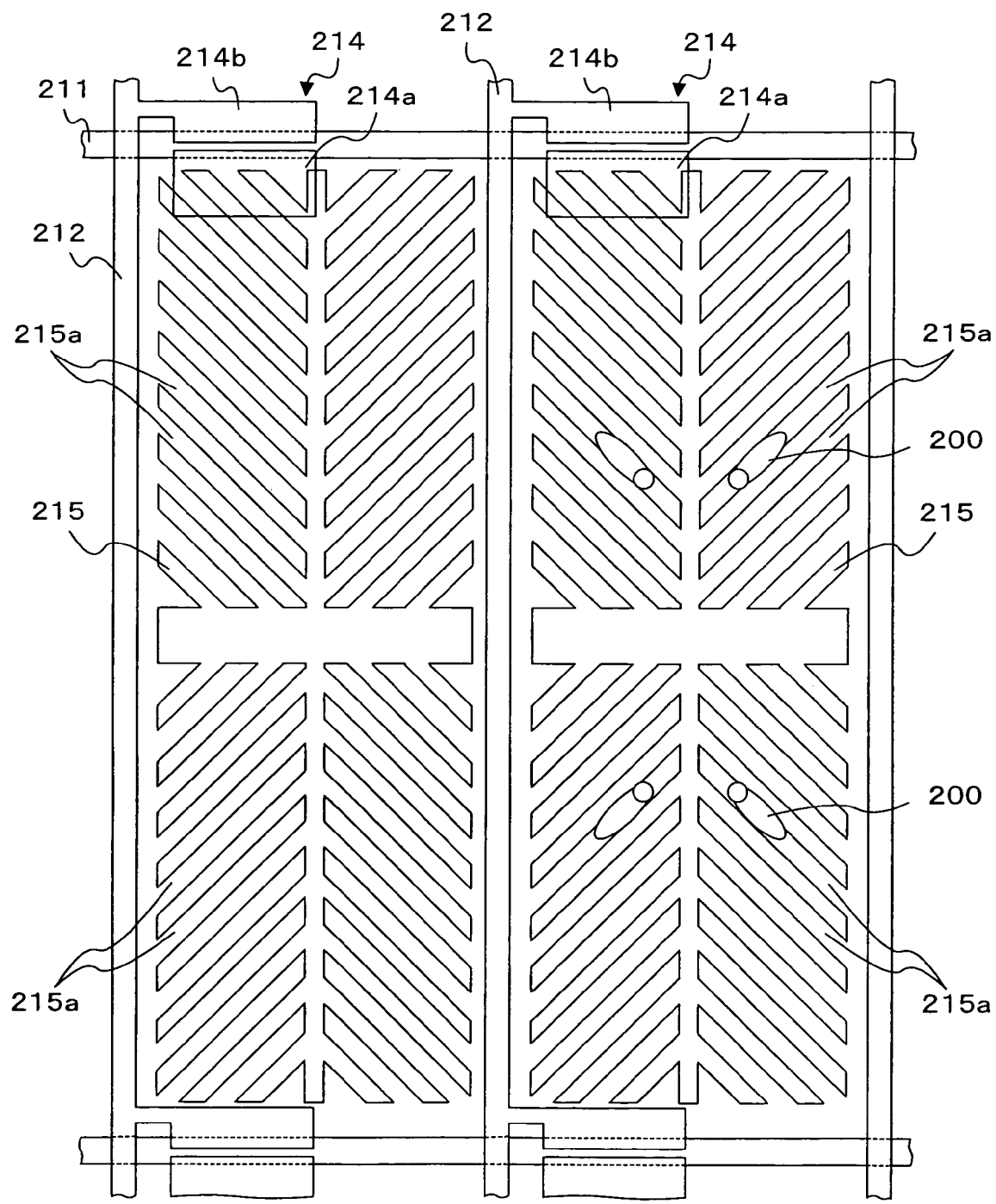
FIG. 18 is a plan view showing a region corresponding to two picture elements of a TFT substrate of a liquid crystal panel used as a test body in the second embodiment.

FIG. 18 is a plan view showing a region corresponding to two picture elements of the TFT substrate of the liquid crystal panel used as a test body.

As shown in this FIG. 18, a plurality of gate bus lines 211 extending horizontally and a plurality of data bus lines 212 extending vertically are formed on the TFT substrate of the liquid crystal panel. A first insulating film (gate insulating film) is formed between the gate bus lines 211 and the data bus lines 212 to electrically isolate the gate bus lines 211 and the data bus lines 212 from each other. Each of rectangular regions defined with the gate bus lines 211 and the data bus lines 212 is a picture element region.

In each picture element region, a TFT 214 and a picture element electrode 215 are formed. In the present embodiment, as shown in FIG. 18, part of the gate bus line 211 is used as the gate electrode of the TFT 214, and the source electrode 214a and the drain electrode 214b thereof are formed to face each other across the gate bus line 211. The drain electrode 214b of the TFT 214 is connected to the data bus line 212, and the source electrode 214a thereof is electrically connected to the picture element electrode 215.

The picture element electrode 215 is formed of transparent conductive material, such as ITO. In the picture element electrode 215, slits 215a are formed as domain regulation structures so that the alignment directions of liquid crystal molecules when a voltage is applied are four directions. That is, the picture element electrode 215 is sectioned into a first region (upper right region) in which, with respect to the horizontal direction, a plurality of slits 215a extending in the direction of 45° are provided, a second region (upper left region) in which a plurality of slits 215a extending in the direction of 135° are provided, a third region (lower left region) in which a plurality of slits 215a extending in the direction of 225° are provided, and a fourth region (lower right region) in which a plurality of slits 215a extending in the direction of 315° are provided. The widths of the slits 215a are 3 μm, and the intervals between neighboring slits 215a are also 3 μm. When a voltage is applied, liquid crystal molecules 200 tilt in the directions of the slits 215a as schematically shown in FIG. 18, and four domains in which the tilt directions of the liquid crystal molecules are different from each other are formed in each picture element.

On the other hand, on the counter substrate, color filters and a common electrode are formed. The color filters are classified into three types of red, green, and blue. A color filter of any one color among red, green, and blue is placed in each picture element. The common electrode is formed of transparent conductive material, such as ITO.

Incidentally, as the base of the TFT substrate, a glass substrate (OA-2 manufactured by Nippon Electric Glass Co., Ltd.) having a plate thickness of 0.7 mm was used. Further, on the surfaces of the TFT substrate and the counter substrate, vertical alignment films (made of polyimide material manufactured by JSR Corporation) were formed by printing, and then, heat treatment was performed at 180° C. for 60 minutes. Furthermore, spacers (manufactured by Sekisui Fine Chemical Co., Ltd.) having diameters of 4 μm were placed between the TFT substrate and the counter substrate.

Using the liquid crystal panel constituted as described above, a liquid crystal display device of a practical example was manufactured. In this liquid crystal display device of the practical example, as shown in FIG. 13, the polarizing plate 202b attached with the circular polarizer 203b and the two refractive index anisotropy compensation films 204a and 204b are placed on one side (light exit side), and the polarizing plate 202a attached with the circular polarizer 203a is placed on the other side (backlight side). For the refractive index anisotropy compensation films 204a and 204b, TAC films manufactured by Fuji Photo Film Co., Ltd. were used. Further, the refractive index anisotropy compensation films 204a and 204b were placed in crossed Nicols.

On the other hand, as comparative example 1, a liquid crystal display device was manufactured in which the polarizing plates 202a and 202b attached with the circular polarizers 203a and 203b, respectively, are placed on both sides of the liquid crystal panel 201 as shown in FIG. 14. This liquid crystal display device of comparative example 1 does not have refractive index anisotropy compensation films.

Further, as comparative example 2, a liquid crystal display device was manufactured in which the polarizing plates 202a and 202b attached with the circular polarizers 203a and 203b, respectively, are placed on both sides of the liquid crystal panel 201 and in which the refractive index anisotropy compensation films 204a and 204b are placed between the liquid crystal panel 201 and the polarizing plates 202a and 202b, respectively, as shown in FIG. 15.

Figure 19:
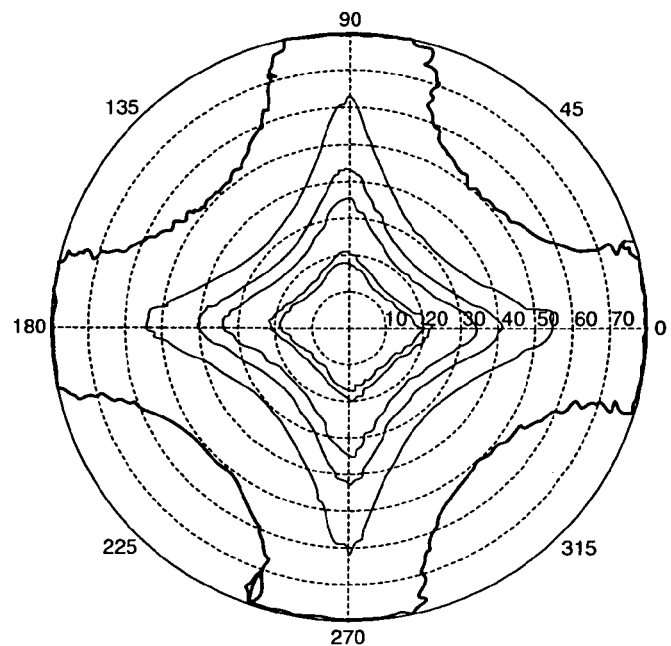
FIG. 19 is a view showing iso-contrast curves of a liquid crystal display device of a practical example.
Figure 20:
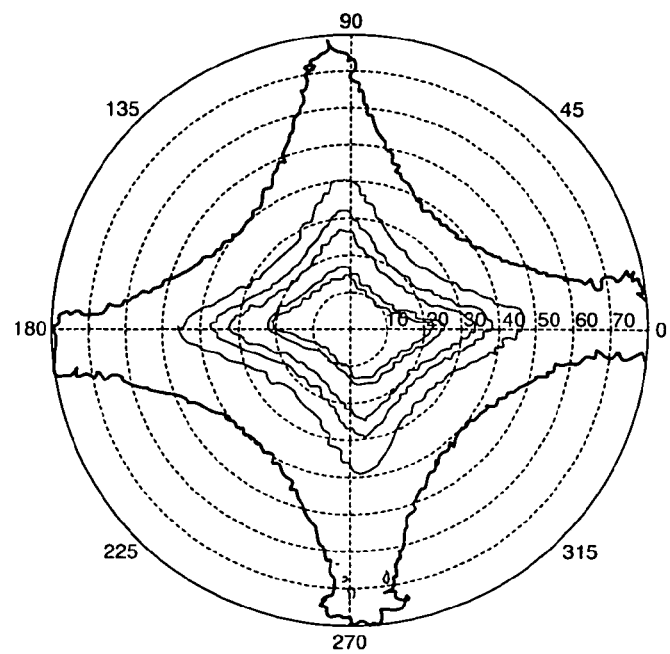
FIG. 20 is a view showing iso-contrast curves of a liquid crystal display device of comparative example 1.
Figure 21:
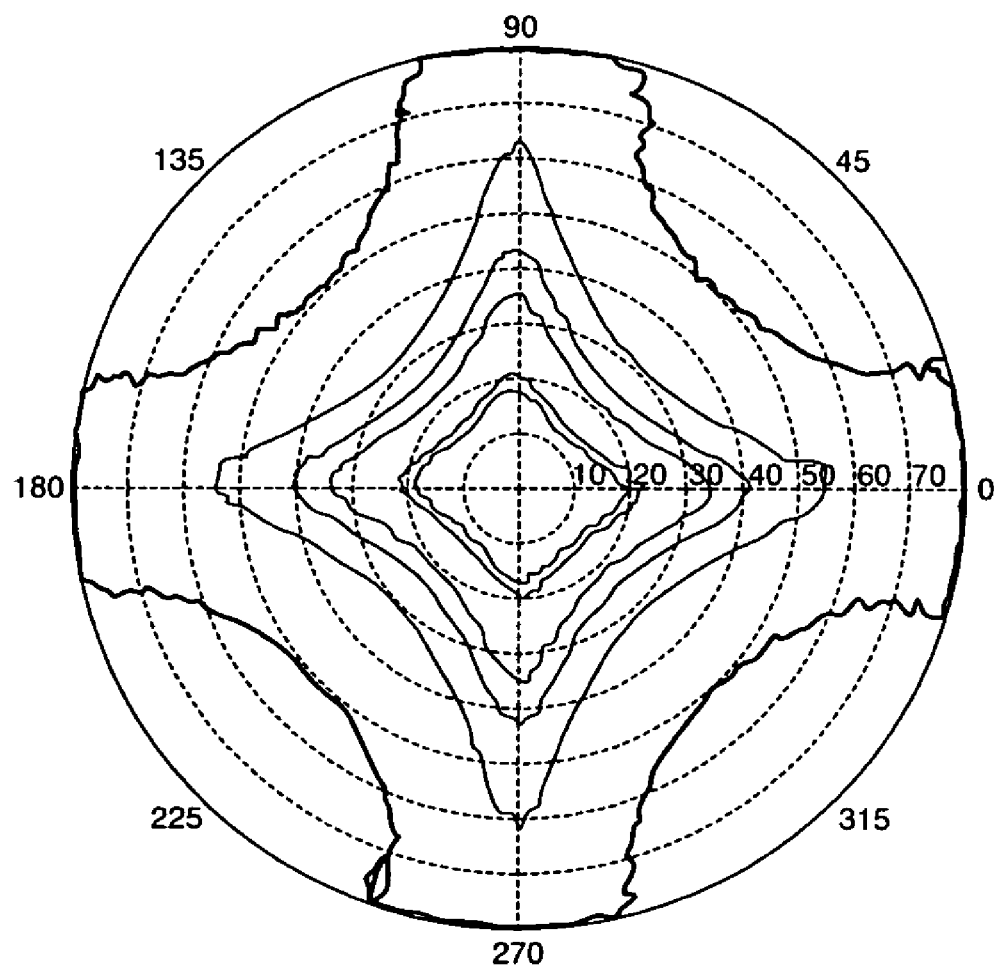
FIG. 21 is a view showing iso-contrast curves of a liquid crystal display device of comparative example 2.

Viewing angle characteristics of these liquid crystal display devices of the practical example and comparative examples 1 and 2 were investigated. FIG. 19 is a view showing iso-contrast curves of the liquid crystal display device of the practical example, FIG. 20 is a view showing iso-contrast curves of the liquid crystal display device of comparative example 1, and FIG. 21 is a view showing iso-contrast curves of the liquid crystal display device of comparative example 2. In each of these FIGS. 19 to 21, among the iso-contrast curves, the outermost curve indicates an angle at which contrast becomes 10. In general, a viewing angle is defined within an angle range in which contrast becomes 10 or more.

As can be seen from FIGS. 19 to 21, in the liquid crystal display devices of the practical example and comparative example 2 which use refractive index anisotropy compensation films, contrast exceeds 10 in the directions of 80° left and right, and up and down, and viewing angle characteristics are excellent compared to the liquid crystal display device of comparative example 1 which does not use refractive index anisotropy compensation films.

The liquid crystal display device of the practical example and that of comparative example 2 have almost equal viewing angle characteristics. However, unevenness of display could not be recognized in the liquid crystal display devices of the practical example and comparative example 1, whereas unevenness of display due to heat generated by the backlight occurred in the liquid crystal display device of comparative example 2.

What is claimed is:

1. A liquid crystal display device comprising:
   a liquid crystal panel made by filling vertical alignment-type liquid crystals into a space between a pair of substrates;
   a first polarizing plate placed on one side of the liquid crystal panel; and
   a second polarizing plate placed on other side of the liquid crystal panel,
   wherein the liquid crystal display device has, between the first and second polarizing plates, at least one of a first retardation layer in which an in-plane retardation in the wavelength range of 380 to 780 nm increases as a wavelength of light increases, and a second retardation layer in which a negative retardation in the wavelength range of 380 to 780 nm decreases as the wavelength of light increases, wherein when the in-plane retardation of the first retardation layer is denoted by Raplate (nm), the in-plane retardation Raplate of the first retardation layer is in the range represented by the following expression:

$$(0.235\pm0.02)\times\lambda - RTAC/2 - 10\pm20$$

where RTAC is a negative retardation of a protective layer for one of the first and second polarizing plates, the protective layer being adjacent to the first retardation layer without an optical intermediate, the negative retardation being at green wavelength, and $\lambda$ is the wavelength of light.

2. A liquid crystal display device comprising:
a liquid crystal panel made by filling vertical alignment-type liquid crystals into a space between a pair of substrates;
a first polarizing plate placed on one side of the liquid crystal panel; and
a second polarizing plate placed on other side of the liquid crystal panel,
wherein the liquid crystal display device has, between the first and second polarizing plates, both of a first retardation layer in which an in-plane retardation in the wavelength range of 380 to 780 nm increases as a wavelength of light increases, and a second retardation layer in which a negative retardation in the wavelength range of 380 to 780 nm decreases as the wavelength of light increases, wherein when the in-plane retardation of the first retardation layer is denoted by Raplate (nm), the in-plane retardation Raplate of the first retardation layer is in the range represented by the following expression:

$$(0.235\pm0.02)\times\lambda - RTAC/2 - 10\pm20$$

where RTAC is a negative retardation of a protective layer for one of the first and second polarizing plates, the protective layer being adjacent to the first retardation layer without an optical intermediate, the negative retardation being at green wavelength, and $\lambda$ is the wavelength of light.

3. The liquid crystal display device according to claim 1, wherein the negative retardation (nm) of the second retardation layer is in the range represented by the following expression:

$$-(0.2\pm0.02)\times\lambda + RLCG + 55 - RTAC\times2\pm30$$

where RTAC is a negative retardation of a protective layer for one of the first and second polarizing plates which is adjacent to the second retardation layer, the negative retardation being at green wavelength, RLCG is $\Delta$nd of a liquid crystal layer of the liquid crystal panel at green wavelength, and $\lambda$ is the wavelength of light.

4. The liquid crystal display device according to claim 1, wherein a polymer film is used as the first retardation layer.

5. The liquid crystal display device according to claim 1, wherein a film using liquid crystals is used as the second retardation layer.

* * * * *